April 5, 1938.   H. A. SILVEN ET AL   2,113,388
GRINDING MACHINE WORK CLAMPING MECHANISM
Filed Dec. 24, 1936   5 Sheets-Sheet 3
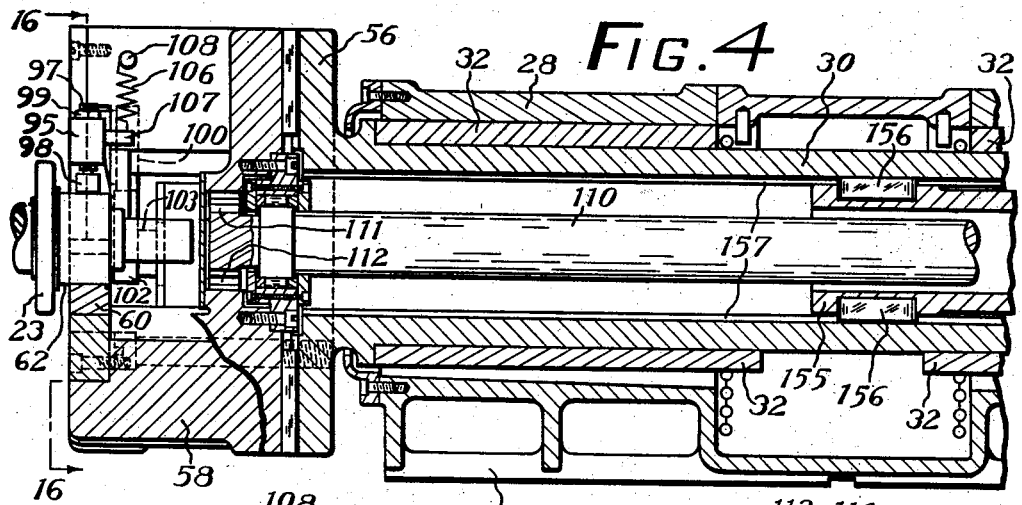
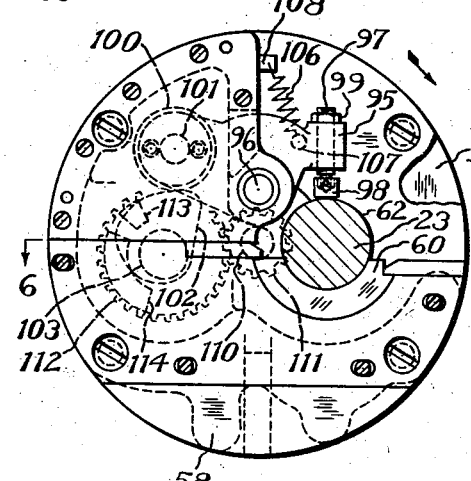
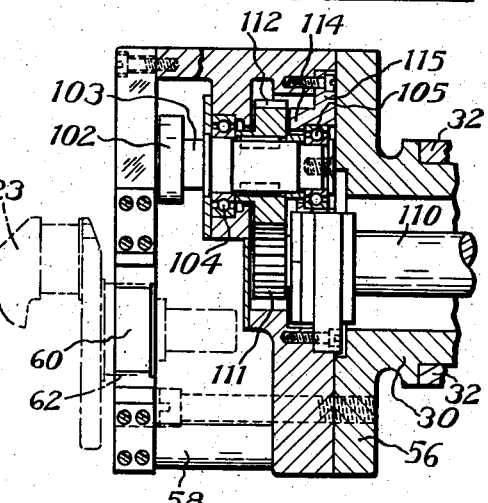
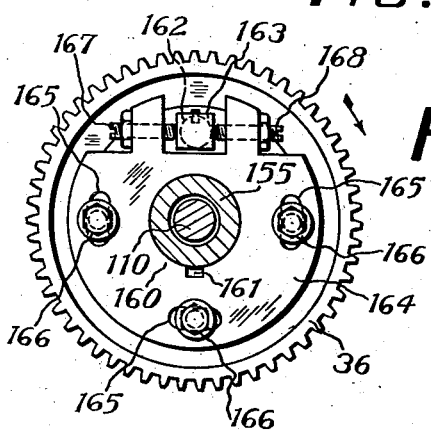
Inventors
HERBERT A. SILVEN
CARL G. FLYGARE
By Harold W. Eaton
Attorney April 5, 1938.  H. A. SILVEN ET AL  2,113,388
GRINDING MACHINE WORK CLAMPING MECHANISM
Filed Dec. 24, 1936  5 Sheets-Sheet 4
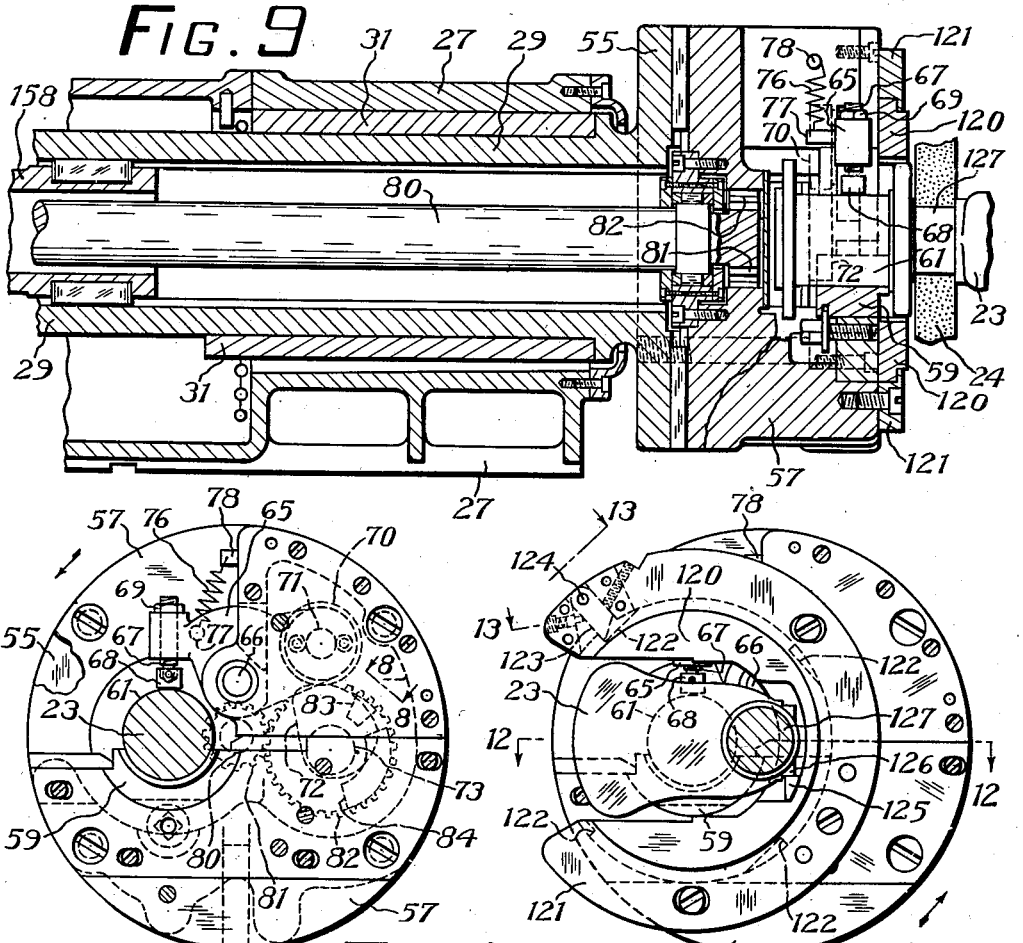
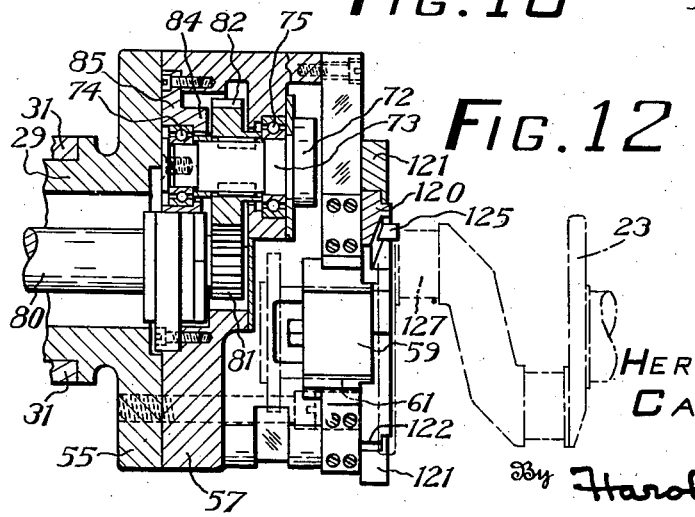
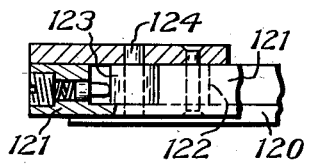
Inventors
HERBERT A. SILVEN
CARL G. FLYGARE
By Harold W. Eaton
Attorney April 5, 1938.   H. A. SILVEN ET AL   2,113,388
GRINDING MACHINE WORK CLAMPING MECHANISM
Filed Dec. 24, 1936    5 Sheets-Sheet 5
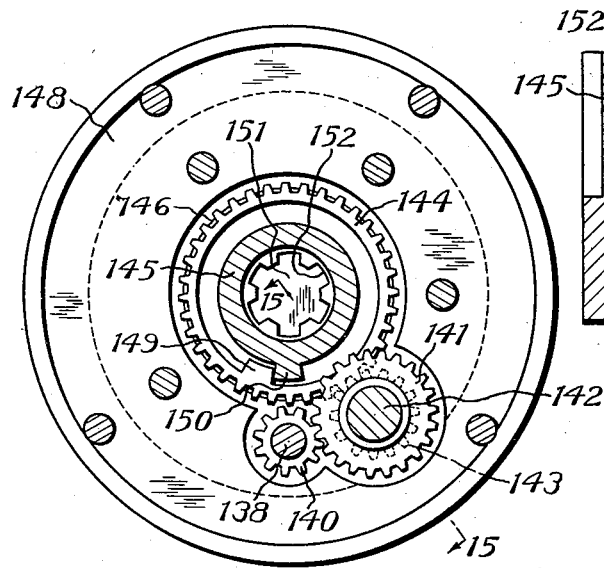
Fig.14
Fig.15
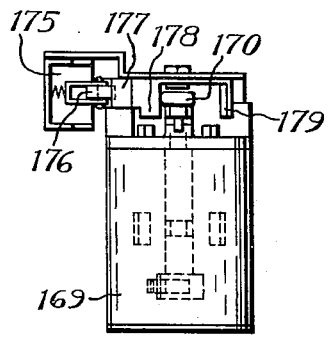
Fig.17
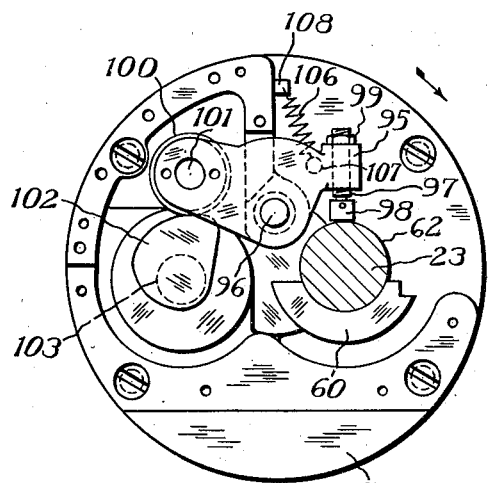
Fig.16
Inventors
HERBERT A. SILVEN
CARL G. FLYGARE
By Harold W. Eaton
Attorney Patented Apr. 5, 1938

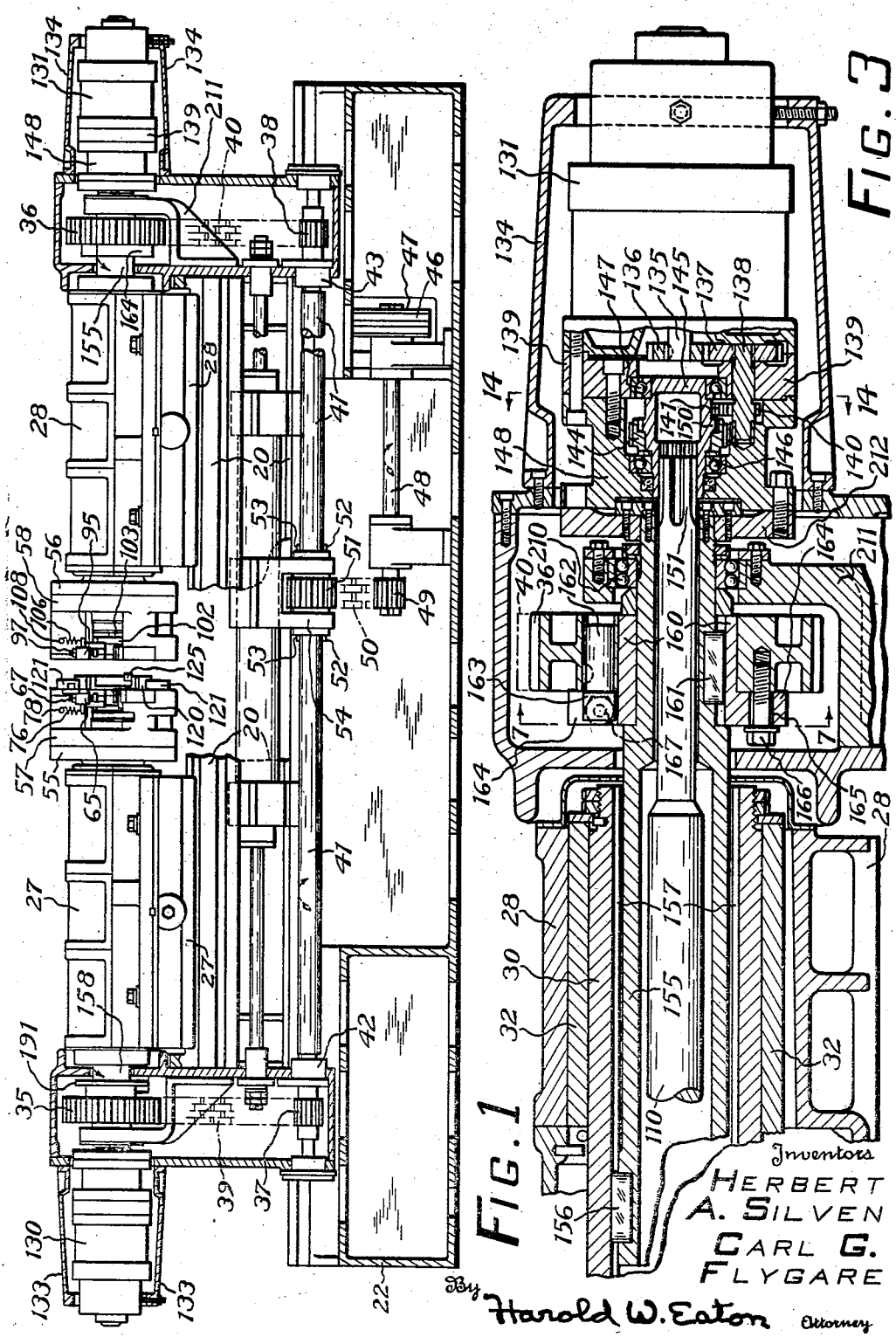

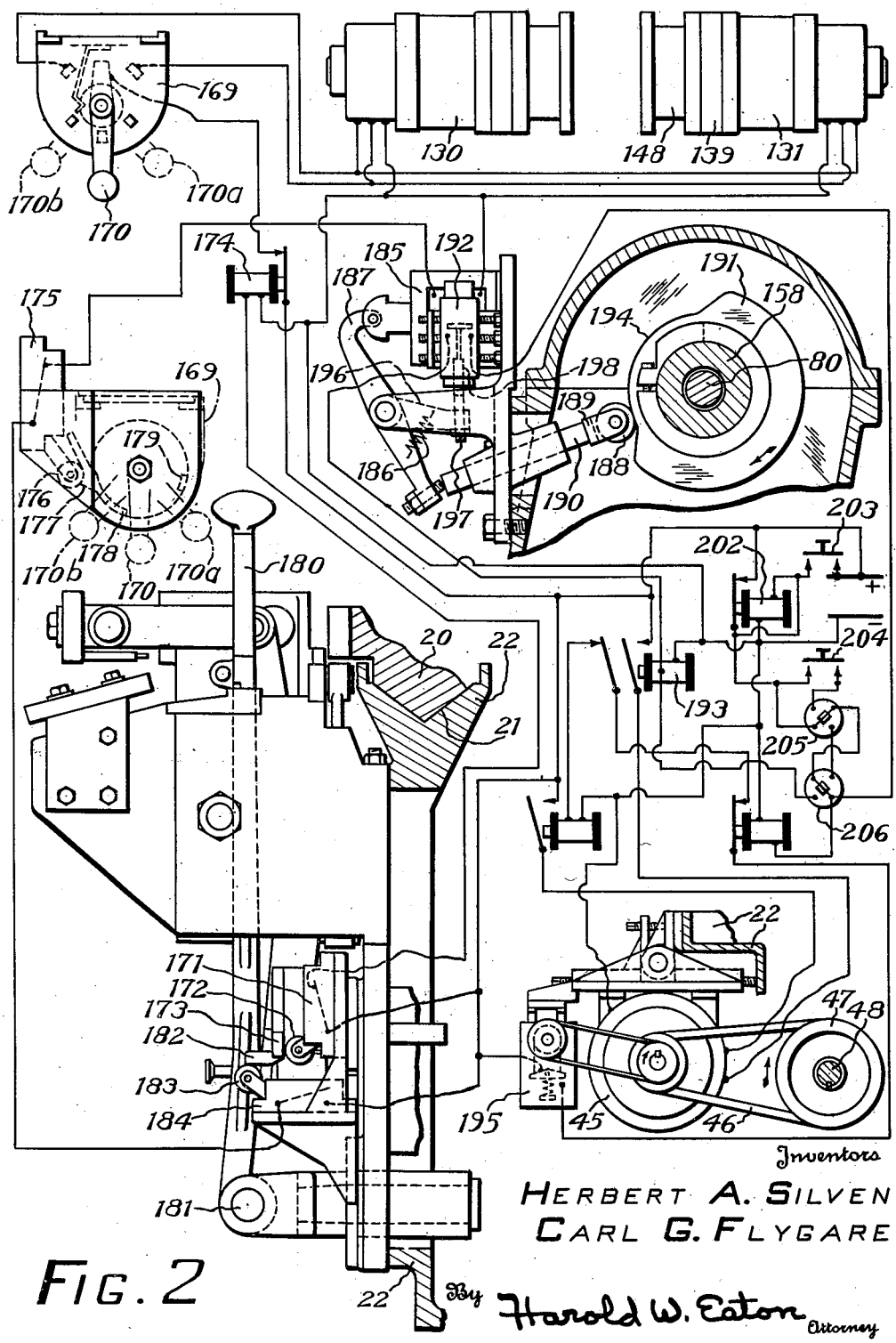

2,113,388

UNITED STATES PATENT OFFICE 2,113,388

GRINDING MACHINE WORK CLAMPING MECHANISM

Herbert A. Silven and Carl G. Flygare, Worcester, Mass., assignors to Norton Company, Worcester, Mass., a corporation of Massachusetts Application December 24, 1936, Serial No. 117,652

13 Claims. (Cl. 51—237)

This invention relates to grinding machines, and more particularly to a work holding, clamping and rotating mechanism for use on a grinding machine of the double head type for crankshaft grinding.

One object of the invention is to provide a simple and thoroughly practical clamping mechanism for a work piece. Another object of the invention is to provide a mechanically operated clamping mechanism for a work piece. Another object of the invention is to provide an electrically actuated work clamping mechanism. A further object of the invention is to provide an electrically actuated cam locked clamping mechanism for a work piece.

A further object of the invention is to provide opposed electrically actuated, cam locked clamping mechanisms for simultaneously clamping the opposite ends of a work piece in position on opposed synchronously rotated work supporting spindles. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of this invention, Fig. 1 is a fragmentary longitudinal sectional view, showing the opposed work supporting and rotating heads and the driving and clamping mechanisms therefor;

Fig. 2 is a fragmentary view of various mechanisms and controls for the machine, together with an electric wiring diagram;

Fig. 3 is a fragmentary longitudinal vertical sectional view, on an enlarged scale, taken through the right-hand work head, as shown in Fig. 1;

Fig. 4 is a fragmentary longitudinal vertical sectional view, on an enlarged scale, of the right-hand work clamping head and its supporting spindle;

Fig. 5 is an end elevation of the right-hand work head, as shown in Fig. 4;

Fig. 6 is a cross sectional view, taken approximately on the line 6—6 of Fig. 5, through the right-hand work head;

Fig. 7 is a fragmentary sectional view, taken approximately on the line 7—7 of Fig. 3, showing the synchronizing adjustment for the spindle driving mechanism;

Fig. 8 is a fragmentary detail view, taken approximately on the line 8—8 of Fig. 10, showing the mechanism for limiting the rotary movement of the cam for actuating the work clamping jaws;

Fig. 9 is a fragmentary longitudinal vertical sectional view, on an enlarged scale, through the left-hand work head, showing the crankshaft indexing mechanism;

Fig. 10 is an end elevation of the left-hand work holder, with the crankshaft indexing mechanism removed;

Fig. 11 is an end elevation of the left-hand work head, with the crankshaft indexing mechanism in operative position;

Fig. 12 is a horizontal sectional view, taken approximately on the line 12—12 of Fig. 11, through the left-hand work head;

Fig. 13 is a fragmentary detail view, on an enlarged scale, taken approximately on the line 13—13 of Fig. 11, of the index pawl;

Fig. 14 is a sectional view, on an enlarged scale, taken approximately on the line 14—14 of Fig. 3, showing the hammer-blow mechanism for clamping and unclamping a work piece;

Fig. 15 is a fragmentary sectional view, on an enlarged scale, taken approximately on the line 15—15 of Fig. 14, through the gear mechanism in the right-hand head;

Fig. 16 is an end elevation of the right-hand work head with plates removed as shown, taken approximately on the line 16—16 of Fig. 4, showing the arrangement of the work clamp actuating mechanism; and Fig. 17 is a front elevation of the control switch for actuating the opposed work clamping heads.

This invention provides an automatic clamping mechanism for a grinding machine, such as crankshaft grinding machines and the like, and which is particularly useful in a double head grinding machine in which two opposed work supporting heads are provided with clamping mechanisms to support and to rotate synchronously the work during the grinding operation. In the form illustrated, a clamping device for holding the work during rotation may comprise a rotatable holding member and a clamping jaw which is movable into engagement with the periphery of an end of the work by a power mechanism controlled by the operator. The clamping jaw may be moved by an electrically operated mechanism into engagement with the work, and it may be similarly released from engagement after the grinding operation has been completed. The work is positively rotated by means of a motor driven mechanism and in order that the clamping jaw may not be released until the work rotation has been stopped, and vice versa, the controlling mechanism for the motor and the clamping jaw are so interlocked and arranged that they may be operated only in a definite sequence.

The double head crankshaft grinding machine illustrated in the drawings comprises a longitudinally movable work supporting table 20 which is adapted to slide longitudinally on a V-way 21 and a flat way (not shown) on the base 22 of the machine. The table 20 is adapted to support a work blank, such as a crankshaft 23, in operative relation with a rotatable grinding wheel 24 (Fig. 9) which may be mounted on any of the old and well known types of wheel slides, such as are common, well known expedients in grinding construction. The wheel slide is provided with a suitable feeding mechanism (not shown) so that the grinding wheel 24 may be fed into the work to grind the same to the desired size. The work table 20 is provided with a pair of work supporting heads 27 and 28 which may be formed integral with the table 20 or may be adjustably clamped thereon so that the heads may be moved laterally of the table to align the axis of one head relative to the axis of the other head and may further be adjusted longitudinally, one relative to the other, to accommodate various lengths of crankshafts.

The heads 27 and 28 are provided with work supporting spindles 29 and 30 journalled in bearings 31 and 32 in the heads 27 and 28, respectively. The work supporting spindles 29 and 30 are rotated by the sprockets 35 and 36, respectively, which are connected with sprockets 37 and 38 by link driving chains 39 and 40, respectively. The sprockets 37 and 38 are mounted on a rotatable drive shaft 41 which is mounted in bearings 42 and 43 depending from the table 20. It will be seen from this construction that any rotation of the shaft 41 will be transmitted through the sprockets and chains to drive the work supporting spindles 29 and 30. The shaft 41 may be driven by a power driven driving mechanism, such as an electric motor 45 (Fig. 2). The motor 45 is supported on the rear of the machine base 22 and is connected by driving belts 46 with a pulley 47 mounted on a drive shaft 48. The other end of the drive shaft 48 is provided with a sprocket 49 which is connected by a link chain 50 with a sprocket 51 which is slidably keyed to the shaft 41 by means of the keys 52 and 53. The sprocket 51 may be held against endwise movement by means of yoked bracket 54 as the table 20 and the shaft 41 are traversed longitudinally.

It is desirable in a machine of this type to provide a suitable control mechanism for stopping and starting the rotation of the work spindles 29 and 30. In the preferred construction, an electrically operated mechanism is provided, such as an electric starting switch which serves to start the rotation of the motor 45 when desired.

An automatic clamping mechanism is utilized, which rigidly locks the crankshaft 23 in place during the grinding operation. As illustrated, the inner ends of the work supporting spindles 29 and 30 are provided with enlarged face plate portions 55 and 56, respectively, to which the work supporting and clamping heads 57 and 58 are secured. Each of the heads 57 and 58 is provided with fixed work supporting and locating bearing members 59 and 60, respectively, adapted to support one of the end bearing portions 61 and 62 of the crankshaft 23. The surfaces of the bearing members 59 and 60 are arranged to support and align the crankshaft 23 for a grinding operation.

Describing the left-hand work head 57 (Fig. 10), a lever 65 is pivotally mounted on a stud 66 on the work head 57 and is provided at its outer end with a projecting stud 67 having a work bearing member 68 loosely mounted on the end thereof. The stud 67 is screw threaded through the end of the lever 65 and is arranged so that it may be locked in adjusted position by means of a lock nut 69. The other end of the lever 65 is provided with a non-rotatable follower roller 70 which is mounted on a stud 71 carried by the lever 65. The roller 70 is arranged to engage the periphery of a rotatable cam 72 which is mounted on the end of a rotatable shaft 73 which is rotatably supported in bearings 74 and 75 in the head 57. The cam 72 is arranged to engage the roller 70, and serves when rotated to rock the lever 65 so as to rigidly clamp the crankshaft 23 within the head 57. A spring 76 interposed between a stud 77 on the arm 65 and a stud 78 carried by the head 57 serves to rock the lever 65 so as to maintain the follower roller 70 in operative engagement with the cam 72 when it is rotated. The cam 72 is actuated by a mechanism to be hereinafter described which rotates a shaft 80 within the spindle 29. A gear 81 is mounted on the outer end of the shaft 80 and meshes with a gear 82 mounted on the shaft 73, so that when the shaft 80 is rotated, the rotary motion will be transmitted through the gear 81, the gear 82, the shaft 73, and the cam 72, to rock the lever 65 and thereby clamp or release a crankshaft 23 in the head.

It is desirable that the rotation of the cam 72 be limited to a partial rotation so that the cam may be moved to lock a crankshaft in the machine and release it therefrom without more than a complete rotation of the cam. The gear 82 is provided with a projecting lug 83 which is arranged in the path of a lug 84 projecting from a plate 85 fixed to the head 57 (Figs. 8 and 10).

The work head 58 is constructed substantially identical to the work head 57 as above described. This head is shown in Figs. 4, 5 and 6 and comprises a lever 95 pivotally mounted on a stud 96 on the work head 58. The lever 95 is provided at its outer end with a projecting adjusting screw 97 having a work bearing shoe 98 loosely mounted on the end thereof. The screw is threaded through the end of the lever 95 and is arranged so that it may be locked in adjusted position by means of a lock nut 99. The other end of the lever 95 is provided with a non-rotatable follower roller 100 which is mounted on a stud 101 carried by the lever 95. The roller 100 is arranged to engage the periphery of a rotatable cam 102 which is mounted on the end of a rotatable shaft 103. The shaft 103 is rotatably supported in bearings 104 and 105 in the work head 58. The cam 102 is arranged to engage the roller 100, and serves when rotated to rock the lever or clamping jaw 95 so as to rigidly clamp the crankshaft 23 within the head 58. A spring 106 interposed between a stud 107 on the arm 95 and a stud 108 carried by the head 58 serves to rock the lever 95 so as to maintain the follower roller 100 in operative engagement with the cam 102 when it is rotated. The cam 102 is actuated by a mechanism to be hereinafter described which rotates the shaft 110 within the spindle 30. A gear 111 is mounted on the outer end of the shaft 110 and meshes with a gear 112 mounted on the shaft 103, so that when the shaft 110 is rotated, the rotary motion is transmitted through the gear 111, the gear 112, the shaft 103, and the cam 102, to rock the lever 95 and thereby clamp or release the crankshaft 23 in the head 58.

The cam 102 is also arranged so that it can be rotated only through a partial turn. A lug 113 projects from the gear 112 and is arranged in the path of a lug 114 projecting from the plate 115 fixed to the head 58 (Figs. 5 and 6). The lug 114 serves to restrict the rotary movement of the cam 102.

In the grinding of a crankshaft having two or more pins arranged on the same axis, it is customary to grind the aligned crank-pins and then to index the crankshaft by a rotary motion to bring another set of crankpins into axial alignment with the axis of the rotary work head for a grinding operation. It is, therefore, desirable to provide an indexing mechanism whereby the crankshaft may be readily inserted in the machine and readily indexed to bring successive crankpins into a grinding position. The left-hand work head is provided with an indexing mechanism comprising a rotary plate 120 which is held in position on the head 57 by means of a C-shaped annular flanged member 121 which is fixed on the work head 57. The index plate is provided with a plurality of notches 122 which are arranged to be engaged by an index or stop pawl 123 which is pivotally mounted on a stud 124 supported in the member 121. The index plate 120 is provided with a locating lug 125 which is arranged to be engaged by a locating lug 126 on the crankshaft 23. When the crankshaft 23 is inserted in the work heads 57 and 58, the index plate 120 is turned until a notch 122 engages the pawl 123 to locate the index plate in its initial position, and the crankshaft 23 is rotated to bring the lug 126 on the shaft into engagement with the lug 125 on the index plate 120, and the shaft is then clamped in position by means of the cam actuated clamping mechanism above described. This serves to bring the crankpin 127 on the shaft 23 into axial alignment with the axis of rotation of the heads 57 and 58. All of the crankpins aligned with the pin 127 are then successively ground to the required predetermined size, after which the rotation of the work holders is stopped and the work clamp released, and the crankshaft 23 and the index plate 120 are indexed to bring the next set of crankpins into axial alignment with the axis of rotation of the heads 57 and 58.

An electrically operated mechanism is provided for actuating the cams 72 and 102 to synchronously actuate the clamping jaws 65 and 95 to rigidly secure opposite ends of a crankshaft 23 in an operating position on the heads 57 and 58. The electric actuating mechanism may comprise a pair of electric motors 130 and 131 which are of a high torque, totally enclosed type from which power is transmitted from an armature shaft 135 through a reduction gear unit to rotate the shaft 80 and 110 to actuate the work clamping mechanism. In order to prevent difficulty in unclamping the work due to a wedging action between the clamping cams and the clamping rollers, a un'que hammer-blow mechanism is provided which serves to operate through projecting lugs in the gear mechanism so that the motor has an opportunity to pick up speed when operated to clamp or unclamp the work piece before the hammer-blow takes place to lock or release the clamping cam from a clamping or unclamped position.

The gear unit between the motors 130 and 131 and the shafts 80 and 110, respectively, is substantially identical; consequently only one of these units has been illustrated in detail (Figs. 13, 14 and 15). The electric motors 130 and 131 are rotatably mounted within enclosed casings 133 and 134 projecting from the opposite ends of the table 20. The motor 131 is provided with an armature shaft 135. A gear 136 is mounted on the outer end of the armature shaft 135 and meshes with a gear 137 which is mounted on a rotatable shaft 138 journaled in a frame 139. The shaft 138 carries a gear 140 which meshes with a gear 141 rotatably mounted on a shaft 142. The shaft 142 also carries a gear 143 meshing with a gear 144. The gear 144 is rotatably mounted on a sleeve 145 which is rotatably supported on bearings 146 and 147 in the casings 148 and 139 respectively.

The gear 144 is provided with an inwardly projecting lug 149 which is arranged in the path of an outwardly projecting lug 150 projecting from the sleeve 145. These lugs serve to allow, through the reduction gearing, several rotations of the armature shaft 135 before the lug 149 carried by the gear 144 rotates so as to engage the lug 150. These two lugs serve as a hammer-blow apparatus to release the cam 72 or 102 from a locked or clamped position without putting an undue burden on the clamping motors. The outer end of the shaft 110 is formed as a splined shaft 151 having projecting splines therefrom which engage and mesh with a correspondingly shaped aperture 152 within the rotatable sleeve 145, so that any rotary motion of the sleeve 145 by the motor 131 serves to transmit a rotary motion to the shaft 110 which in turn, through the gears 111 and 112, serves to rotate the clamping cam 102 to clamp or release a crankshaft 23 in the head 58. An identical mechanism is provided for actuating the shaft 80 so as to simultaneously clamp the opposite end of the shaft into an operating position on the head 57. Since these mechanisms are identical, it is not believed to be necessary to illustrate and describe both in detail.

The splined connection between the shafts 80 and 110 and their respective clamping motor units 130 and 131, respectively, allows the work heads 27 and 28 to be adjusted longitudinally on the table 20 without disturbing the driving connection between the driving motors 130 and 131 and the clamping mechanism on the heads 57 and 58, respectively.

Similarly, it is desirable to provide a splined connection in the drive for the work rotating spindles 29 and 30 so that the drive to the spindle is not interrupted or disconnected by a longitudinal adjustment of the heads 27 and 28. A sleeve 155 is slidably keyed by a key 156 to the spindle 30. The key 156 slides longitudinally in an elongated keyway 157 within the spindle 30. The driving sprocket 36 is connected to rotate the sleeve 155. A similar construction is provided for driving the spindle 29. A sleeve 158 is interposed between the spindle 29 and the sprocket 35.

In order to prevent torsional strains being set up in the work table or fixed part of the machine due to the clamping operation, it is desirable to mount the clamping motors 130 and 131 so that they revolve with the spindles 29 and 30 during the grinding operation.

In order to accomplish this result, the outer end of the sleeve 155 is mounted in a bearing 210 which is supported in a bracket 211 which is fixed relative to the table 20. The bearing 210 serves as a radial and thrust bearing support for the outer end of the sleeve 155. The sleeve 155 carries at its outer end a plate 212 to which is secured a casing 148 of the reduction gear unit. The motor 131 is fixedly mounted to the casing 148 so that the motor 131 rotates with the casing 148, the sleeve 155, and the spindle 30 during the grinding operation. When the spindles 29 and 30 are stopped during the unloading period, the armature shaft 135 of the motor 131 may be rotated, as above described, to clamp or release a work piece from the heads 55 and 56. A similar mounting is provided for supporting the motor 130 so that it rotates with the spindle 29 during the grinding operation. Since this mounting is substantially identical to the mounting for the motor 131 above described, it is not deemed necessary to illustrate or describe this arrangement in detail.

In order to align the work heads 57 and 58, that is to adjust them angularly relative to each other in setting up the machine, it is desirable to provide an adjustment for at least one of the heads so that the heads may be aligned and any backlash between the driving chains and the sprockets may be eliminated so that a uniform synchronous driving movement may be obtained to each of the heads 57 and 58. This is preferably accomplished by providing a rotary adjustment for adjusting the gear 36 relative to the sleeve 155. The gear 36 is rotatably mounted on sleeve 160 which is interposed between the gear 36 and the sleeve 155. The sleeve 160 is locked to the sleeve 155 by means of a key 161. A pin 162 is keyed to the sprocket 36, and is provided with a square head 163. The sleeve 160 is provided with an integral flanged member 164 having elongated slots 165 provided therein. Clamping screws 166 pass through the elongated slots 165 and are screw threaded into the gear or sprocket 36, thus permitting a rotary adjustment of the sprocket 36 relative to the sleeve 155. By loosening the clamping screws 166, and adjusting the opposed push and pull screws 167 and 168 (Fig. 7), the flange 164 may be adjusted angularly relative to the gear or sprocket 36, as desired. After the desired adjustment has been made, the flange 164 may be clamped in adjusted position to the sprocket 36 by tightening the clamping screws 166.

The work clamping motors 130 and 131 are of the reversible type and are arranged so that when the armature shaft rotates in one direction, the reduction gear mechanism above described serves to rotate the clamping cam in a direction to clamp the crankshaft 23 in operative position on the machine. When the current to the motors 130 and 131 is reversed, through the reduction gear mechanism, the clamping cams on each of the heads 57 and 58 are rotated in the reverse direction and the released tension of the springs 76 and 106 serves to rock the clamping arms 65 and 95 to release or unclamp the crankshaft. A lever actuated drum type reversing switch 169 is provided to control the direction of rotation of the clamping motors. The reversing switch 169 is controlled by a manually operable lever 170. When the control lever 170 is moved into position 170a, the electric circuit is completed to rotate the motors 130 and 131 in a direction to actuate the clamping jaws 65 and 95 to clamp a crankshaft 23 in an operative position to the work heads 57 and 58. Similarly, when the lever 170 is moved into position 170b, the current in the motor circuit is reversed to reverse the direction of rotation thereof and to unclamp or release the clamping jaws so that the ground work piece may be readily removed from the machine.

It is desirable to provide a safety interlock which will prevent rotation of the work clamping motors 130 and 131 in either direction unless the main control lever 180 is in a work clamping position, so as to prevent releasing the crankshaft from the machine when the work heads are rotated or the table or wheel slide is in a feeding position. A normally open limit switch 171 having an actuating roller 172 is connected so that when the main control lever 180 is in a clamping position, as shown in full lines in Fig. 2, a lug 173 on the lever 180 serves to close the limit switch 171 which in turn serves to actuate a relay or magnetic switch 174 to render the reverse switch 169 operative. When the lever 180 is rocked away from the position illustrated in Fig. 2, that is, in a counterclockwise direction, the lug 173 recedes from the roller 172 and allows the limit switch 171 to open which in turn opens the relay or magnetic switch 174 and thereby cuts off the current to the reversing switch 169, thereby rendering the work clamping motors 130 and 131 inoperative.

It is also desirable to provide a further interlock which serves to prevent starting the work rotation motor 45 except when the work clamps have been actuated to grip a work piece 23. A limit switch 175 is mounted so as to be actuated by and in timed relation with the reversing movement of the lever 170 of the reversing switch 169. The limit switch 175 is provided with an actuating roller 176. A cam 177 is carried by a rotatable member having downwardly projecting lugs 178 and 179 which lie in the path of the lever 170 of the reversing switch 169 (Figs. 2 and 17). In the position of the limit switch 175 and its associated parts, the limit switches 184 and 175 are in series with each other and are connected so that when either of the limit switches is opened, the solenoid 185 is deenergied and the tension of the spring 186 holds the trip switch 192 in an open position so as to prevent starting of the work rotation. When the lever 180 is moved into the position illustrated in Fig. 2, the cam 182 carried thereby contacts the roller 183 and opens the limit switch 184, thus breaking the circuit and rendering the solenoid 185 ineffective. In this position of the parts, the lever 170 of the reverse switch 169 may be moved to clamp or release a work piece in the work heads 57 and 58.

In order that the work holders 57 and 58 may be automatically stopped in a predetermined vertical or upright position for loading, a suitable mechanism (Fig. 2) is provided which is operated in timed relation with the control mechanism so that when the main control lever, pivotally mounted on a stud 181 (Fig. 2), is shifted after a crankpin has been ground to move the steadyrest and wheel slide to an inoperative position, a cam 182 carried by the lever 180 engages a roller 183 of a normally closed limit switch 184 to open the same. The limit switch 184 breaks the circuit to deenergize a solenoid 185 which is mounted on the rear of the table 20. The deenergizing of the solenoid 185 releases the tension of a spring 186 which serves to rock an arm 187 into the position illustrated in Fig. 2 to move a roller 188 carried by a yoke 189 on the end of a slidably mounted rod 190, so that the roller 188 rides upon the periphery of a cam 191 which is mounted on sleeve 158 to rotate with the work supporting spindle 29.

The motor 45 for rotating the work supporting spindles 29 and 30 is preferably of a type which is controlled by a magnetic reverse starter switch and a motor brake switch 195 so that the rotation of the motor may be stopped in a predetermined position after a grinding operation has been completed. In the electric diagram shown in Fig. 2, the electric motor 45 is provided with two fields which are controlled by a magnetic starter reverse switch 193 which controls the forward and reverse fields of the motor 45. When the control lever 180 is shifted to stop the work rotation at the end of a grinding operation, the normally closed limit switch 184 is opened by movement of the lever 180, which serves to de-energize the solenoid 185, allowing the follower roller 188 to move into contact with the cam 191. The movement of the follower roller 188 into operative contact with the cam 191 serves to open a normally closed trip switch 192 which opens the circuit and cuts the power from the power field of the electric motor 45. This breaking of the circuit in the power field serves through a motor brake switch 195 to actuate a magnetic reverse starter switch, which serves instantaneously to reverse the current in the motor and, through the motor brake switch 195, to stop the motor 45, spindles 29 and 30 and work heads 57 and 58 in a predetermined position each time the work rotation is stopped. When the solenoid 185 is deenergized, the follower roller 188 is moved into operative engagement with the periphery of the cam 191 and the normally closed trip switch 192 remains closed until the follower roller 188 rides into the low point or depression 194 of the cam 191 which serves through an arm 196 and an adjustable screw 197 carried thereby to engage the plunger 198 of the trip switch 192 to open the switch and thereby cut off the power from the power field of the motor 45.

A safety switch 202 is mounted in the power line and serves to render the circuit inoperative in case the electric current fails. If the electric current supplied to the driving motor 45 fails, the switch 202 opens, and before the work rotation can be again started, the reset push button 203 must be pushed to close the circuit which in turn serves to close the safety switch 202 and thereby again start the rotation of the motor 45. A push button 204 serves as a jogging switch to jog the rotation of the work holder, if desired. The snap switch 205 in the power circuit serves in one position to permit a jogging of the work rotation by the push button 204 or in the opposite position serves to start the rotation of the motor 45. A snap switch 206 in one position serves to render the automatic control of the work rotation operative and in a second position, that is, moved toward the right as viewed in Fig. 2, serves to render the manual control operative and permit a jogging of the work rotation, as desired. By manipulation of the push buttons 203 and 204 and the snap switches 205 and 206, the rotation of the work drive motor 45 may be readily controlled, as desired. When the control switches are set for automatic operation, the movement of the main control lever 180 into the position shown in Fig. 2 serves to render the cam 191 and the follower roller 188 operative, so that the motor 45 will be stopped in a predetermined position and the work holders 57 and 58 will be stopped in an upright or loading position.

The operation of the machine is readily apparent from the foregoing disclosure. Assuming the work heads 57 and 58 to be stopped in a loading position and the control lever 180 to be in the position illustrated in Fig. 2, a crankshaft 23 to be ground is placed in position with the journal bearings 61 and 62 at its opposite ends resting upon the supporting bearing surfaces 59 and 60, respectively, on the heads 57 and 58. The operator then shifts the control lever 170 of the reversing switch 169 into position 170a to start the rotation of the work clamping motors 130 and 131 which serves, through the reduction gear mechanism above described, to rotate the cams 72 and 102 which in turn rock the clamping jaws 65 and 95 to lock the crankshaft securely in operative position on the opposed heads 57 and 58, respectively. During the shifting movement of the lever 170 into position 170a, the lever 170 engages the lug 179 (Figs. 2 and 17) and rocks the cam 177 in a counterclockwise direction (Fig. 2) which serves to close the limit switch 175. In this position of the parts, the main control lever 180 may then be rocked in a counterclockwise direction (Fig. 2) to start the work rotation and the grinding cycle. When the lever 180 is rocked from the position illustrated in Fig. 2, the cam withdraws from engagement with the roller 183 of the limit switch 184 and allows the limit switch 184 to close, thereby energizing the solenoid 185 which in turn rocks the arm 187 and the arm 196 to allow the trip switch 192 to close, thereby starting the rotation of the work drive motor 45. The grinding operation may then be continued until the pin has been ground, after which any other pins on the shaft may be ground by traversing the table 20 longitudinally to position the next aligned crankpin in position for grinding. After all of the aligned pins have been ground, the lever 180 may again be shifted into the position shown in Fig. 2 which serves through the cam 191 and its associated parts and the motor brake switch 195 instantaneously to reverse the direction of flow of current to the motor 45 to bring the motor to an instantaneous stop. In this position, the limit switch 184 has been opened and the limit switch 171 closed so that the lever 170 of the reverse switch 169 may be shifted from position 170 into position 170b.

During this movement of the control lever 170, the lever engages the lug 178 and continued movement of the lever 170 shifts the cam 177 in a clockwise direction so that the roller 176 rides over the high point of the cam 177 and again recedes to a sufficient extent to open the limit switch 175, thereby breaking the circuit and de-energizing the solenoid 185 so as to open the trip switch 192 and prevent starting of the work rotation during the time the heads are unclamped. The crankshaft may then be indexed by rotating the indexing plate 120 in a counterclockwise direction until the next notch 122 travels by the index or locating pawl 123 and the plate 120 is then moved in a clockwise direction until the locating surface of the notch 122 engages the index or locating pawl. The lever 170 may then be shifted into position 170a which serves again to shift the cam 177 and to close the limit switch 175 and at the same time start the rotation of the clamping motors to again clamp the crankshaft in position for the next operation on the shaft. In case the electric power fails, the magnetic switch 202 opens and before the machine can be again started, it is necessary for the operator to close the push button 203 to again operate the magnetic starter switch 202.

By actuating the push button 204 and the snap switches 205 and 206, the work heads may be either continuously rotated automatically under the control of the main control lever, or if desired the work heads may be jogged or inched by means of the jogging button 204.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:—

1. A work supporting and rotating mechanism for a grinding machine comprising a rotatable spindle, means including an electric motor to rotate said spindle, means including a clamping jaw and an opposed work bearing member which is rotatable with the spindle to support a work piece thereon, an electrically operated device to operate said jaw, manual means to control said motor, a manually operable reversing switch to operate said electrical device and clamping jaw, and an electrical interlock including a limit switch associated with said reversing switch to prevent the clamping member from being disengaged before the work rotation motor has been stopped.

2. In a crank grinding machine, work clamping and supporting means comprising a jaw pivoted to grip the work eccentric with respect to its axis of rotation, said jaw being mounted on a lever extending at right angles to the axis of rotation of the work, a rotatable cam for actuating said jaws, and electrically operated means including a reversible electric motor for simultaneously actuating said cams and jaws simultaneously to clamp or release a work piece.

3. A work supporting and rotating mechanism for a grinding machine comprising a rotatable spindle, means including an electric motor to rotate said spindle, a work supporting head including a clamping jaw and an opposed work bearing member rotatable with said spindle to support a work piece thereon, a cam on each head for actuating said jaw, means including an electric motor to operate said cam and jaw, manual means including a switch to control said spindle rotation motor, means including a reversing switch to control the second motor, and means including a limit switch associated with said reversing switch and said first switch necessitating movement of the clamping jaw to engage the work before the first motor can be started to rotate the spindle.

4. In a crank grinding machine having a grinding wheel, a work carriage, opposed crank heads on the carriage and rotary spindles on said crank heads, crank clamping means comprising pivoted levers each having work engaging jaws mounted therein, electrically operated means for moving said jaws simultaneously to crank engaging position, and means actuated thereby including a hammer-blow mechanism for rapidly releasing a work piece therefrom.

5. In a crank grinding machine having a grinding wheel, a work carriage, opposed crank heads on the carriage, rotary spindles on said crank heads, crank clamping fixtures comprising pivoted levers with work engaging jaws thereon, and electrically operated means including a rotatable cam for operating said levers.

6. In a crank grinding machine having a grinding wheel and opposed crank heads, work supporting and driving means comprising a lever extending at right angles to the axis of rotation of the work and having a work gripping jaw, a rotatable cam on each of said heads arranged to actuate said jaws, electrically operated means including an electric motor on each of said heads and arranged to actuate said cams, and means for operating said motor simultaneously to actuate said cams to grip or release a work piece.

7. In a grinding machine, a pair of opposed heads, means for holding the work between said heads comprising a lever on each head, a jaw on said lever, a rotatable cam on each head which is arranged to actuate said lever to clamp or release the same, electrically operated means including an electric motor on each of said heads, operative connections between said motor and said cam for actuating the clamping jaws, and means for simultaneously operating said motor simultaneously to clamp or release said jaws.

8. In a crank grinding machine having a grinding wheel, opposed rotatable crankshaft supporting heads, a lever on each head having a gripping jaw, a rotatable cam on each head, a rotatable shaft within each head to support said cams, and electrically operated means including an electric motor for simultaneously rotating each of said shafts and cams and simultaneously applying pressure equally to said gripping jaws.

9. In a crank grinding machine having a grinding wheel, a work carriage, opposed crank heads on said carriage, a hollow rotatable spindle on each of said crank heads, crank clamping fixtures on said shaft, a movable jaw in each fixture, a rotatable cam on each head arranged to actuate said jaws, a rotatable shaft to actuate each of said cams and extending axially within each spindle, an electric motor on each of said heads which are operatively connected to rotate said cams to clamp or release a work piece, and a single control for simultaneously actuating each of said motors.

10. In a crank grinding machine having a grinding wheel, a work carriage, opposed crank heads on the carriage, rotatable spindles on said crank heads, crank clamping fixtures on said spindles, a movable jaw in each fixture, a rotatable cam on each fixture which is arranged to actuate the jaw, actuating means for said cams extending axially within each of said spindles, a motor on each of said heads which are connected to actuate said cams to clamp or release a work piece thereon, a reduction gear mechanism interposed between each motor and cam, and a single control switch to simultaneously stop or start said motors in either direction.

11. In a crank grinding machine having a grinding wheel, a work carriage, opposed crank heads on said carriage and rotatable spindles on said crank heads, crankshaft clamping means comprising pivoted levers on each head having work engaging jaws mounted therein, a cam on each head for actuating said levers, and means including an electrically operated mechanism for simultaneously actuating said cams and moving said jaws to or from a clamping position.

12. A work supporting and rotating mechanism for a grinding machine comprising a rotatable spindle, means including an electric motor to rotate said spindle, means including a clamping jaw and an opposed work bearing member which is rotatable with the spindle to support a work piece thereon, an electrically operated device to operate said jaw, manual means to control said motor, a manually operable reversing switch to operate said electric device and clamping member, and an electrical interlock including a limit switch associated with said reversing switch to prevent starting the work rotation before the clamping jaw has been actuated to clamp a work piece therein.

13. A grinding machine comprising a slidably mounted table, means including a rotatable spindle on said table for supporting a work piece, a work supporting head on said spindle, a movable clamping jaw revolving with the head and cooperating therewith to hold the work piece on said head, a cam on said head for actuating said jaw, an electrically operated mechanism including an electric motor which is mounted to rotate with said spindle, and connections between said motor and said cam to actuate said clamping jaw.

HERBERT A. SILVEN.
CARL G. FLYGARE.